United States Patent [19]

Feigel

[11] Patent Number: 5,775,470
[45] Date of Patent: Jul. 7, 1998

[54] HYDRAULIC CONTROLLABLE VIBRATION ABSORBER

[75] Inventor: Hans-Joerg Feigel, Rosbach, Germany

[73] Assignee: ITT Automotive Europe GmbH, Germany

[21] Appl. No.: 244,109

[22] PCT Filed: Nov. 14, 1992

[86] PCT No.: PCT/EP92/02627

§ 371 Date: Aug. 22, 1994

§ 102(e) Date: Aug. 22, 1994

[87] PCT Pub. No.: WO93/09966

PCT Pub. Date: May 27, 1993

[30] Foreign Application Priority Data

Nov. 18, 1991 [DE] Germany ............ 41 367 915.2

[51] Int. Cl.⁶ .............. F16F 9/46; B60G 11/26
[52] U.S. Cl. ............................ 188/299; 188/285
[58] Field of Search .................. 188/285, 299, 188/319, 322.15; 280/707, 714

[56] References Cited

U.S. PATENT DOCUMENTS

| | | | |
|---|---|---|---|
| 4,650,042 | 3/1987 | Knecht et al. | 188/299 |
| 4,674,768 | 6/1987 | Morra | 280/707 |
| 5,161,647 | 11/1992 | Bayer et al. | 188/1.11 |
| 5,439,085 | 8/1995 | Woessner | 188/299 |

FOREIGN PATENT DOCUMENTS 4005513  9/1990  Germany.

*Primary Examiner*—Robert J. Oberleitner
*Assistant Examiner*—Chris Schwartz
*Attorney, Agent, or Firm*—J. Gordon Lewis; Thomas N. Twomey

[57] ABSTRACT

A hydraulic controllable vibration absorber for an automotive vehicle has a power cylinder that is divided a vibration absorber piston into a first power chamber, which is configurated above the vibration absorber piston, and a second power chamber, which is configurated beneath the vibration absorber piston. These configurations allow both chambers to be brought into connection with a balancing chamber. The vibration absorber is equipped with a sensor arrangement which affords a recognition of the direction of movement of the vibration absorber piston. The sensor arrangement is inserted between the second power chamber and the balancing chamber.

27 Claims, 3 Drawing Sheets

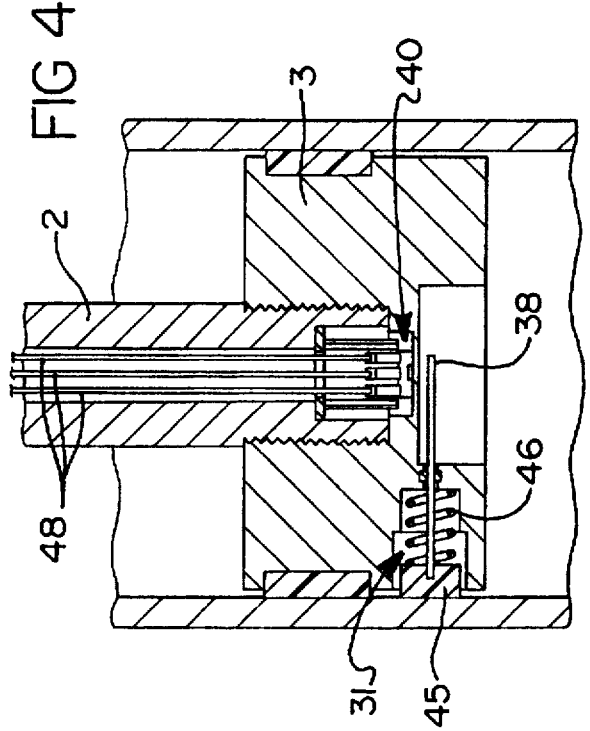
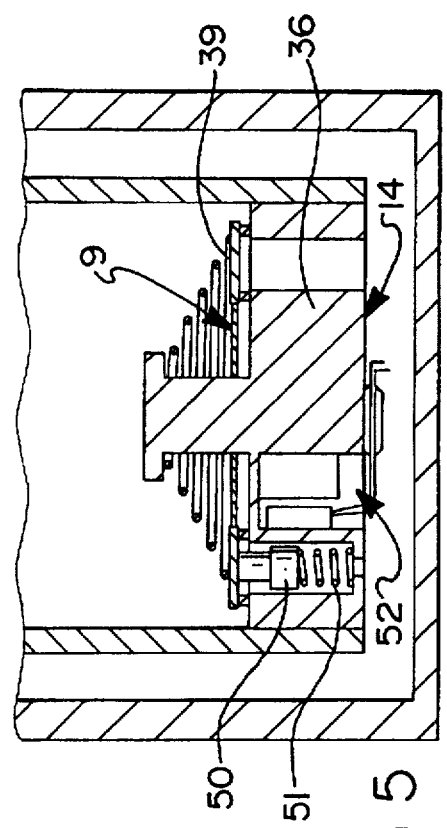
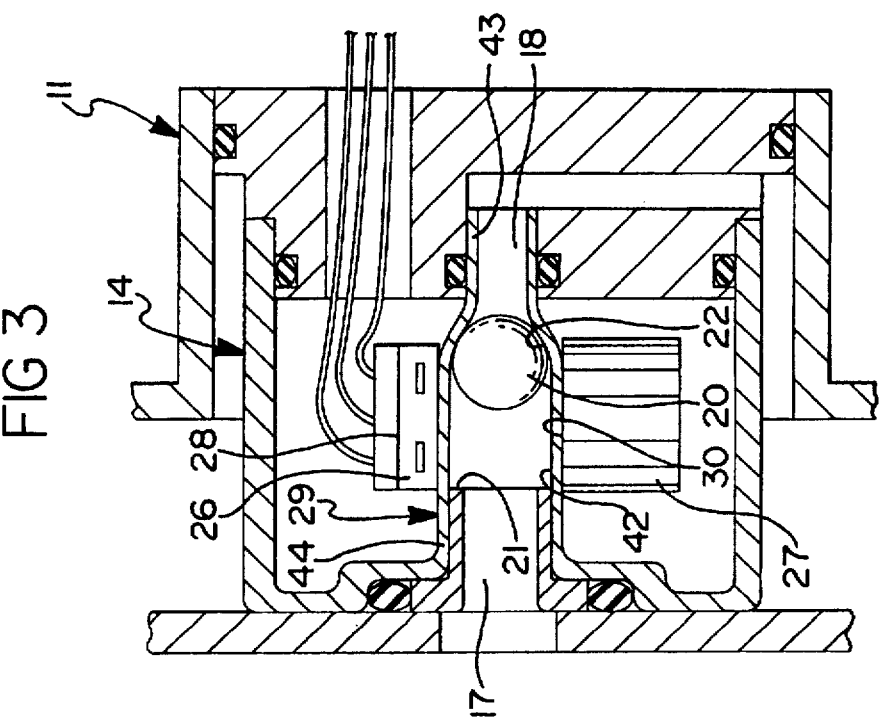

HYDRAULIC CONTROLLABLE VIBRATION ABSORBER

FIELD OF THE INVENTION

The invention is related to a hydraulic controllable vibration absorber for an automotive vehicle.

BACKGROUND OF THE INVENTION

A known hydraulic controllable vibration absorber has a power cylinder whose interior space is subdivided by a piston that is slidable by means of a piston rod into a first power chamber and a second power chamber. The vibration absorber also has a balancing chamber that is connected or connectable to both power chambers and linked to the first power chamber through a connecting duct and to the second power chamber through a first non-return valve. Furthermore, the vibration absorber has a second non-return valve that is subjectible to the pressure existing within the second power chamber. Finally, the vibration absorber has a controllable vibration absorber valve which affords variations of the vibration absorbing force and a sensor arrangement whose output variable affords a recognition of the direction of movement of the piston.

A vibration absorber of this kind is known from the German patent application published without examination, No. 4.005.513. Sensors are provided in a first section of the piston rod in order to determine whether the prior-art vibration absorber is in the thrust phase or in the traction phase, which said sensors determine the pressure differential of the vibration absorber liquid within the two power chambers of the power cylinder and which interact with means for the generation of actuating signals which influence electrically actuatable means in the sense of a regulation of the exchange of the vibration absorber liquid between the two power chambers. In this context, the means mentioned in the first place and the electrically actuatable means are preferably arranged in a second section of the piston rod.

The complicated structure of the piston rod whose manufacture as well as assembly require a considerable expenditure and therefore has to be regarded less advantageous in the state-of-the-art vibration absorber. The mode of adjustment of the vibration absorbing force is also felt to be disadvantageous, which takes place within the piston rod and which is brought about by an interaction of a plurality of electrical as well as mechanical constructional components.

SUMMARY OF THE INVENTION

It is, therefore, the object of the present invention to provide a hydraulic vibration absorber with adjustable vibration absorption, of the kind mentioned, which features a simpler set-up and, thus, allows manufacture at low cost. In particular, the variation of the vibration absorbing force which the invention is aimed is to be rendered possible by making use of the simple design of the invention, with reliably functioning component parts.

According to the invention, this object is attained in that the sensor arrangement is inserted between the first power chamber and the balancing chamber. Owing to this provision, a favorable positioning of the sensor arrangement is outside of the piston rod and outside the piston, for example in the bottom range, laterally at the vibration absorber housing.

In one embodiment of the invention, which is especially suited both for two-tube and for one-tube vibration absorbers and in which the sensor arrangement is positioned within the piston, the sensor arrangement is actuatable by frictional engagement with the power cylinder. The direction of movement of this piston is recognized directly by a change of its position, without any pressure change having to take place.

In another solution of the object as mentioned, the sensor arrangement is positioned in the guide range of the piston rod, within the power cylinder, and is actuatable by frictional engagement with the piston rod. This positioning has the advantage of allowing the electric lines to be connected to the sensor arrangement to be routed outside the piston rod.

The sensor arrangement is constituted by a sensor element that is movable at a limited extent and that interacts with a recording device which is positioned stationarily within the piston, within the guide range of the piston rod, which monitors the piston rod's position. The sensitivity of the sensor arrangement is determined in a simple, advantageous manner by the stroke of the sensor element and as far as existing by the selection of the mechanical transmission ratio.

A faster recognition of the direction of movement of the piston in the event of a change from the thrust to the traction stage is achieved in that between the second power chamber and the balancing chamber a second sensor arrangement is inserted, the first and the second sensor arrangements having different switching point values.

According to another feature of the present invention, an improvement of the sensitiveness can be attained by hydraulic surface transmission. This can be attained in that the sensor arrangement is actuatable by the differential pressure existing between the second power chamber and the balancing chamber. In this context, the sensor arrangement is preferably constituted by a sensor element which is subjectible to the differential pressure, which is movable at a limited extent within a sensor housing and which interacts with a recording device monitoring its position. The recording device is arranged so as to be unmovable. The sensitiveness of the sensor arrangement allows to be adjusted by a change of the stroke or of the cross-sectional area of the sensor element.

In a further version of the invention, the sensor element is configured in the shape of a ball which is guided within said sensor housing and whose movement is limited, on one hand, by a stop and, on the other hand, by a sealing seat. In this conjunction, the ball constitutes a cheap precision component by whose interaction with a sealing seat elevated pressures will be rendered possible even in the presence of low piston speeds. As a preferable alternative, the ball may be loaded or pre-stressed (biased) by spring, as a result whereof external acceleration influences will largely be eliminated.

According to a further aspect of the invention, a precision manufacture of the sealing seat interacting with the ball-shaped sensor element is attained in that the sealing seat is provided at the end of a pressure agent duct which is in connection with the balancing chamber. The sealing seat is configured within the sensor housing and preferably has a configuration in the shape of a sleeve being arranged so as to be unmovable and separate within said sensor housing.

Preferably, the ball consists of magnetizable material, so that magnetic recording devices may be utilized.

According to another feature of the invention, a greater functional reliability of the vibration absorber is achieved in that, within the pressure agent ducts being configurated within the sensor housing, the sensor element is preceded by filters which protect said sensor element against soiling.

According to yet another aspect of the invention, the recording device is configurated in the shape of an electric switching circuit which can be preceded by a magnetic, respectively by an optical switching circuit. The output signals which are generated by the electric switching circuit will allow favorably to be processed further electrically, a contactless sensing being possible simultaneously.

In accordance with another inventive feature a particularly cheap solution is attained in that said recording device is constituted by a Hall element which interacts with a permanent magnet and with an evaluating electronic unit. It will be of particular advantage in this conjunction when both sensor arrangements are disposed within one sensor housing, their recording devices interacting with one single permanent magnet.

In a further advantageous embodiment of the invention, the temperature dependence of the sensor arrangement will allow largely to be eliminated when the Hall element is conceived as a differential Hall sensor.

According to another aspect of the invention a reasonable simplification of the further signal transmission is achieved in that the Hall element is conceived as a digital Hall sensor.

According to another preferred embodiment of the invention, the lines of force of the magnetic field generated by the permanent magnet are aligned at right angle to the direction of movement of the sensor element. An elevated measuring effect is attained by this provision.

According to another aspect of the invention, the sensor element and the recording device are separated from each other by a partition wall which is provided within the sensor housing. Since the recording device is located in a "dry" space, no compression-proof cable passage will, for example, be required.

In a particularly inexpensive embodiment of the invention, the partition wall is configurated in the shape of a wall of a tubular guide section which guides the sensor element and which is disposed within the sensor housing and/or is configurated so as to form one piece with it.

The sensor housing is shut by means of a closing element which is configurated as a means for the strain relief of electric lines leading to the evaluating electronic unit. A multifunctional utilization of the closing element will be safeguarded in this way.

According to yet another aspect of the invention a centering pin is envisaged in the sensor housing which interacts with a groove being configurated in said closing element. It is the aim achieved in this way that no adjusting of the sensor arrangement will be necessary during the assembly.

Another embodiment of the invention which allows it to be manufactured at particularly low cost is achieved in that the sensor housing is constituted by the valve body of the first non-return valve within which a sensor element is prestressed in the direction of its closing member and actuatable by the closing member, which is disposed so as to be movable at a limited extent.

In another embodiment of the invention, the sensor arrangement is positioned laterally at the power cylinder, respectively at an external tube that is arranged coaxially with said power cylinder, preferably at a right angle to the longitudinal axis of the power cylinder. Good accessibility in the event of an exchange of the sensor arrangement will be ensured by the aforementioned arrangement.

According to an especially compact designed embodiment of the invention, that the sensor arrangement, respectively arrangements, are disposed in the bottom range of the power cylinder.

Further details, features and advantages of the invention will be understood by the following description of four embodiments, making reference to the accompanying drawing. In the drawing:

BRIEF DESCRIPTION OF THE DRAWINGS

FIG. 1A is a diagrammatic depiction of first and second sensors residing within a common housing.

FIG. 3 is an enlarged section of a second embodiment of the sensor arrangement which is slightly modified with respect to the embodiment shown in FIG. 2;

FIGS. 4 and 5 are enlarged sections showing third and fourth embodiments, respectively, of the sensor arrangement.

DETAILED DESCRIPTION OF THE PREFERRED EMBODIMENT

Figure 1:
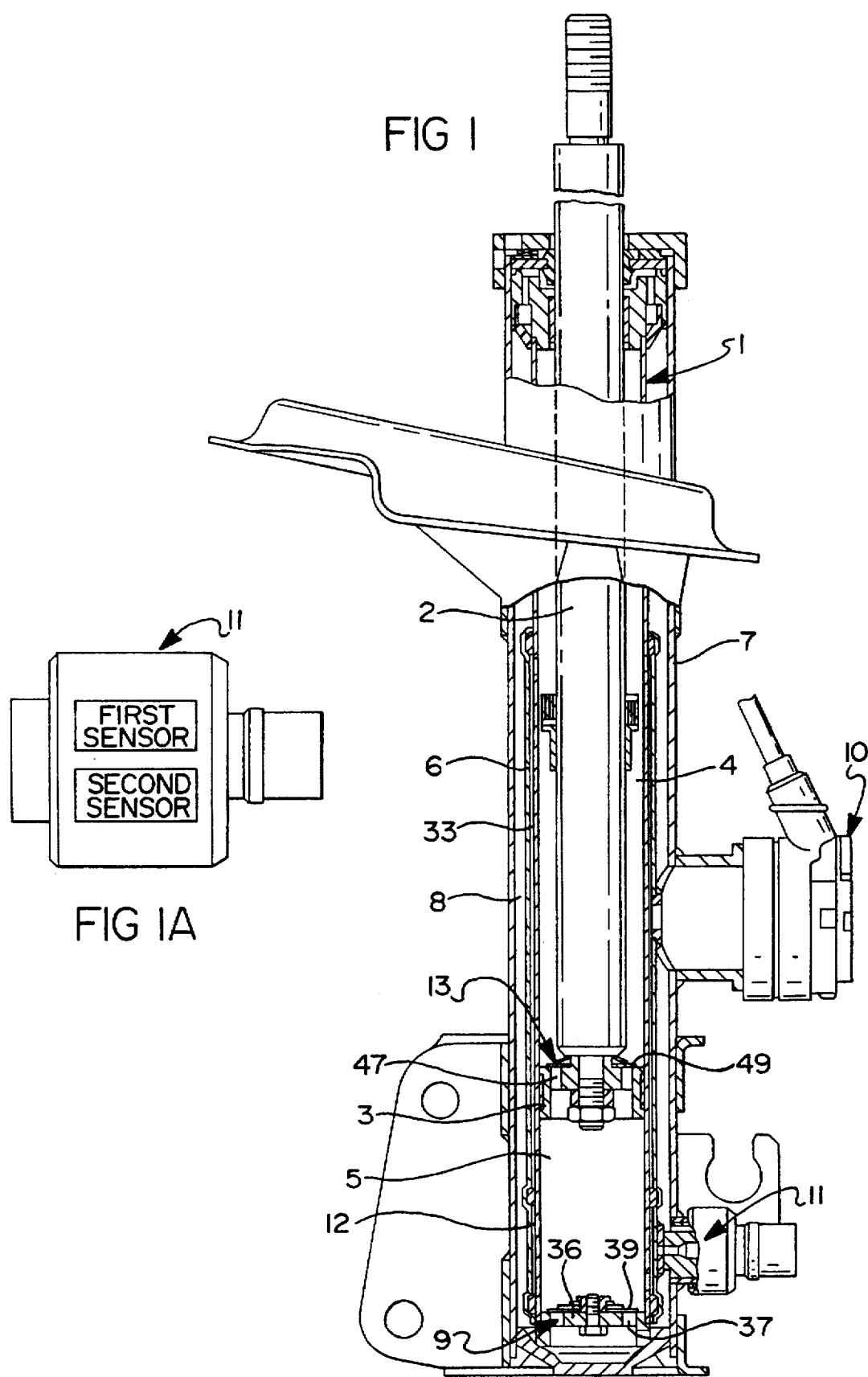
FIG. 1 is a diagrammatic representational section of an inventive controllable vibration absorber in accordance with the present invention.

The controllable vibration absorber diagrammatically illustrated in FIG. 1 is comprised of a power cylinder 1 and of a tube 6 being arranged coaxially with the power cylinder 1, so that a connecting duct 33 is formed between them. Coaxially with the power cylinder 1 and the tube 6, an external tube 7 is disposed, which, jointly with said tube 6, defines a balancing chamber 8 having a circular ring-shaped cross section. The chamber 8 is partly filled with oil and interacts with the connecting duct 33. The interior space of the power cylinder 1 is subdivided by means of a piston 3 that is slidable by a hollow piston rod 2 into a first power chamber 4 which is configurated above the piston 3 and a second power chamber 5 which is configurated beneath said piston 3.

In the bottom range of the vibration absorber there is a first non-return valve 9 which is effective in the traction stage, whereas within the piston 3 a second non-return valve 13 is configurated. The second valve 13 is effective in the thrust stage. The two non-return valves 9, 13 are designed identically as to their set-up and each includes a resiliently prestressed valve disc 39, 49 which interacts with passages 37, 47 provided in a valve body 36, respectively in the piston 3. The first non-return valve 9 affords in the traction stage an intake of the oil from the balancing chamber 8 into the second power chamber 5, while the second non-return valve 13 opens in the thrust stage and releases a connection between the second power chamber 5 and the connecting duct 33. If necessary, in order to be able to realize modifications of the vibration absorbing force of the vibration absorber, a vibration absorber valve 10, which is identified in general by reference numeral 10, is provided. The vibration absorber valve is effectively inserted between the connecting duct 33 and the balancing chamber 8 and is designed in such a way that it allows a flow through it in one direction only. The vibration absorber valve 10, which is preferably secured to the external tube 7 at a right angle to the longitudinal axis of the vibration absorber, serves to modify the cross-sectional area of flow of the aforementioned connection between the connecting duct 33 and the balancing chamber 8.

In order, during the operation of the vibration absorber, to detect the direction of movement of the piston 3, a first and a second sensor 11 are arranged laterally in the bottom range at the external tube 7. The sensors 11 may be positioned within a common sensor housing and are inserted between the second power chamber 5 (through an annular hydraulic chamber 12 being defined by said tube 6) and the balancing chamber 8. Design variants of the sensor arrangements can be seen in FIGS. 2 to 4.

Figure 2:
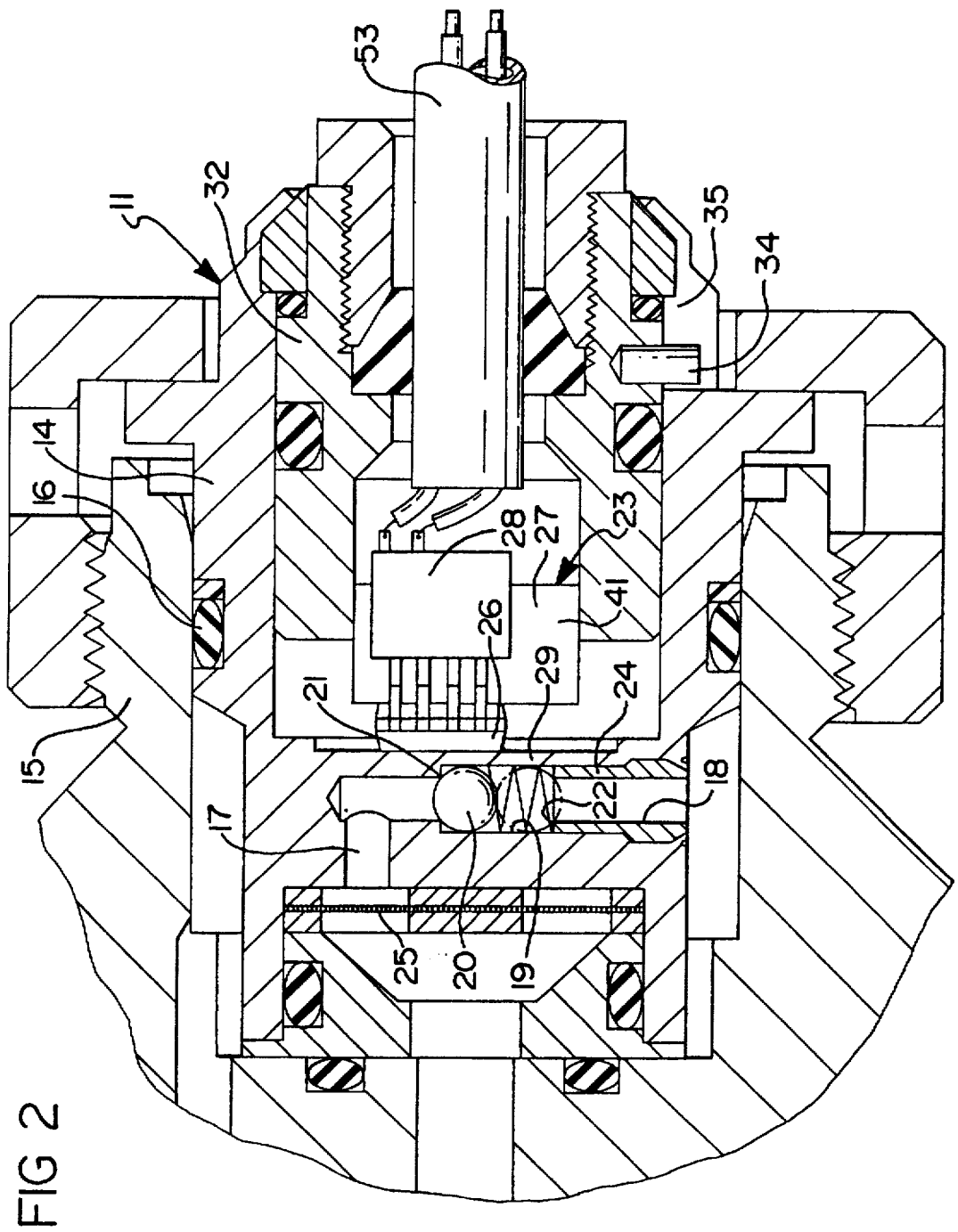
FIG. 2 is an enlarged section of a first embodiment of a sensor arrangement in accordance with the present invention.

As may be seen, in particular, in FIG. 2, the sensor arrangement 11, which is preferably accommodated by a connecting element 15 being secured at right angle to the longitudinal axis of the vibration absorber, is comprised of a sensor housing 14 of non-magnetic material. The housing 14 is sealed against the connection element 15 by means of a seal, for example, an O-ring 16. The sensor housing 14 is furnished with pressure agent ducts 17, 18. Pressure agent ducts 17, 18 are in connection with the second power chamber 5 and with the balancing chamber 8 of the inventive vibration absorber. In the range of transition of the pressure agent ducts 71, 18, a cylindrical bore 19 is within the sensor housing 14. The cylindrical bore 19 serves as a guide for a sensor element 20, for example, a ball of magnetizable material being slidable at a limited extent. The movement of the ball 20 along the guide 19 is limited, on one side, by a stop 21 being configurated at the end of the first pressure agent duct 17 and, on the other side, by a sealing seat 22 which is configurated at the end of a sleeve 24 which forms the second pressure agent duct 18 and is arranged separately within the sensor housing 14. It will be of advantage in this conjunction when at least one of the pressure agents ducts 17, 18 is preceded by a filter 25, so that impurities are kept away from the guide range of the sensor element 20.

Still referring to FIG. 2, the position of the sensor element, that is, of the ball 20, is monitored by a recording device 23 which is stationarily disposed within the sensor housing 14 and which may preferably be embodied as an electronic switching circuit preceded by a magnetic switching circuit. The shown recording device 23 is constituted a by a Hall element 26 which interacts with a permanent magnet 27 and with an evaluating electronic unit 28 whose output signals are conveyed over electric lines 53 of a control circuit not shown in the drawing. As components of the recording device 23 differential, digital Hall sensors as well as various magneto-resistive sensors may, for example, be applied in this context. It will, furthermore, be highly favorable when the lines of force of the magnetic field generated by the permanent magnet 27 run at right angle to the direction of movement of the ball 20.

The recording device 23 is accommodated within a chamber 41 which is configurated in the sensor housing 14 and which is defined, on one side, by a partition wall 29 disposed proximate to the pressure agent ducts 17, 18 and, on the other side, by a closing element 32. The closing element 32 serves simultaneously as a means for the strain relief of electric lines 53 leading from the evaluating electronic unit 28. In this context, said sensor housing 14 and the closing element 32 are made of non-magnetic materials. In order, finally, to facilitate the assembly of the sensor arrangement, a centering pin 34 is provided in the closing element 32 which, in the event of closing, the sensor housing 14 is introduced into a groove 35 being configurated therein, so that no adjustment of the sensor arrangement 11 will be required.

In a second embodiment of the inventive sensor arrangement 11 illustrated in FIG. 3, the partition wall 29 is forced by the wall of a tubular guide section 30 in which the ball-shaped sensor element 20 is guided. The guide section 30 is furnished in this configuration with a first portion 42 of larger diameter, which defines the first pressure agent duct 17 and within which the ball 20 is slidingly guided, and with a second portion 43 of smaller diameter, which partly belongs to the second pressure agent duct 18. The range of transition between the two portions 42, 43 form the sealing seat 22, which has already been mentioned. The stop 21, limiting the movement of said ball 20 within the guide section 30, is configurated at a sleeve 44, which is pushed into the guide section 30. The magneto-resistive element, that is the Hall element 26 sensing the movement of the ball 20 is preferably integrated in the evaluating electronic unit 28 in this conjunction which is separated from the permanent magnet 27 by the tubular partition wall 29 and, for that matter, in such a way that said evaluating electronic unit 28 and the permanent magnet 27 are positioned on opposite sides of the guide section 30.

The mode of functioning of the sensor arrangement 11 illustrated in FIGS. 2 and 3 is very simple and is based on the effect of the hydraulic pressures existing in the balancing chamber 8 and in the lower power chamber 5. In the event of a movement of the piston 3, as shown in FIG. 1, in downward direction, which corresponds to the thrust stage, the pressure within the lower power chamber 5 will become higher than the hydraulic pressure existing within the balancing chamber 8, so that a force component directed to the right, as viewed in FIG. 1, will act upon the ball 20. This force component will slide the ball 20 in the direction of the sealing seat 22 which will be closed. In the traction stage, that is, in the event of a movement of the piston 3 in upward direction, a vacuum will come about in the lower power chamber 5 and a movement of the ball 20 in the direction of the stop 21 will take place against which the ball 20 will finally come to be abutted. The described movements of the ball 20 will be monitored by the recording device 23 whose evaluating electronic unit 28 will generate output signals. The output signals will subsequently be processed further in the control circuit, which has been mentioned and which is not shown in the drawing.

In a third embodiment of the invention, shown in FIG. 4, the sensor arrangement 31 senses the direction of movement of the piston 3 and is accommodated within the piston 3. The particularity of the illustrated sensor arrangement 31 is that it is actuatable mechanically, by frictional engagement with the power cylinder 1. In this configuration, the sensor arrangement 31 is comprised of a sensor element 38 which is supported within the piston 3 so as to be tiltable to a limited extent. The sensor element 38 is preferably plate-shaped or rod-shaped and, at its end facing the wall of the power cylinder 1, bears a friction element 45 which interacts with the power cylinder 1 and which is prestressed in the direction of the power cylinder 1 by means of a compression spring 46. The vertical movement of the end of the sensor element 38 facing away from the wall of the power cylinder is sensed by a recording device 40 positioned proximate to the attachment of the piston rod 2 to the piston 3. The output signals of the recording device are conveyed forth over electric lines 48 which are routed through the hollow piston rod 2 for further processing to the control circuit, which has been mentioned and which is not shown in the drawing. Alternatively, an embodiment can, however, be visualized although not shown in the drawing, in which the sensor arrangement is positioned in the guide range of the piston 2 within the power cylinder 1 and which is actuatable by frictional engagement with the piston rod 2.

In a fourth embodiment of the invention, shown in FIG. 5, the sensor arrangement 11 is, finally, accommodated in the valve body 36 of the first non-return valve 9 which is positioned in the bottom range of the power cylinder 1 and which simultaneously constitutes the sensor housing 14. The valve body 36 accommodated a sensor element 51, which is prestressed in the direction of the closing member 39 by means of a compression spring 51, is movable to a limited extent. The valve body 36 is actuatable by the closing member 93 of the first non-return valve 9. The position of the valve member 36 is monitored by means of a recording device 52 which, as mentioned, can, for example, be constituted by a magneto-resistive element such as a Hall element, by a permanent magnet, and by an evaluating electronic unit. The valve body 36 and the closing member 39 consist in this embodiment of a non-magnetic material, whereas the sensor element 50 consists of magnetizable material.

I claim:

1. A hydraulic controllable vibration absorber for an automotive vehicle comprising:
    a power cylinder having a bottom and having a subdivided interior space, said subdivided space including a first power chamber and a second power chamber;
    a piston and a piston rod, said piston being slidable by said piston rod into said first power chamber and said second power chamber;
    a balancing chamber in connection with both said power chambers;
    a connecting duct linking said balancing chamber to the first power chamber;
    a first non-return valve linking said balancing chamber to the second power chamber;
    a second non-return valve subjectible to pressure existing within the second power chamber;
    a controllable vibration absorber valve for varying a vibration absorbing force, and a sensor arrangement having an output variable for recognizing the direction of movement of the piston, said sensor arrangement being inserted between said second power chamber and said balancing chamber, wherein said sensor arrangement is actuable due to a pressure differential existing between said second power chamber and said balancing chamber.

2. A vibration absorber as claimed in claim 1, wherein said sensor arrangement comprises a sensor housing, a first sensor element which is subjectible to said pressure differential, which is movable to a limited extent within said sensor housing, and which interacts with a recording device monitoring the position of said sensor element, said recording device being arranged so as to be unmovable.

3. A vibration absorber as claimed in claim 2, wherein said recording device comprises a Hall element, a permanent magnet, and an evaluating electronic unit, said Hall element interacting with said permanent magnet and with said evaluating electronic unit.

4. A vibration absorber as claimed in claim 3, wherein both said sensor arrangements are positioned within one sensor housing, said recording devices of both sensor arrangements interacting with one single permanent magnet.

5. A vibration absorber as claimed in claim 4, wherein said sensor housing is disposed proximate the bottom of said power cylinder.

6. A vibration absorber as claimed in claim 3, wherein said sensor housing is shut by a second closing element being a means for relieving strain relief of electric lines leading to said evaluating electronic unit.

7. A vibration absorber as claimed in claim 6, wherein said sensor housing has grooves configured therein and wherein a centering pin is disposed in said second closing element, said pin interacting with said groove.

8. A vibration absorber as claimed in claim 3, wherein said Hall element is a differential Hall sensor.

9. A vibration absorber as claimed in claim 3, wherein said Hall element is a digital Hall sensor.

10. A vibration absorber as claimed in claim 3, wherein the lines of force of a magnetic field generated by the said permanent magnet are aligned at a right angle to the direction of movement of said sensor element.

11. A vibration absorber as claimed in claim 2, wherein said sensor element is configurated in the shape of a ball which is guided within said sensor housing, said housing having a stop and a guide seat and the movement of said ball being limited by said stop and by said guide seat.

12. A vibration absorber as claimed in claim 11, wherein said ball is biased by a spring.

13. A vibration absorber as claimed in claim 12, wherein within said pressure agent duct filters precede said sensor element.

14. A vibration absorber as claimed in claim 11, wherein said sensor housing includes a pressure agent duct configured therein, said stop being provided at the end of said pressure agent duct which is in connection with said second power chamber.

15. A vibration absorber as claimed in claim 11, wherein said sensor housing includes a pressure agent duct configured therein, said sealing seat being provided at the end of said pressure agent duct which is in connection with said balancing chamber.

16. A vibration absorber as claimed in claim 15, wherein said pressure agent duct is configurated in the shape of a sleeve which is arranged within the said sensor housing so as to be unmovable.

17. A vibration absorber as claimed in claim 2, wherein said sensor housing has a partition wall and said sensor element and said recording device are separated from each other by said partition wall.

18. A vibration absorber as claimed in claim 17, wherein said partition wall is a tubular guide section which guides said sensor element and which is disposed within said sensor housing.

19. A vibration absorber as claimed in claim 2, wherein said sensor element consists of magnetic material.

20. A vibration absorber as claimed in claim 2, wherein said recording device comprises a magneto-resistive element, a permanent magnet, and an evaluating electronic unit, said magneto-resistive element interacting with a said permanent magnet and with said evaluating electronic unit.

21. A vibration absorber as claimed in claim 2, wherein said sensor housing is made of non-magnetic material.

22. A vibration absorber as claimed in claim 2, wherein said valve body and said closing element are made of non-magnetic material, and wherein said sensor element is made of magnetizable material.

23. A vibration absorber as claimed in claim 1, wherein between said second power chamber and said balancing chamber a second sensor arrangement is inserted, said first and said second sensor arrangements having different switching point values.

24. A vibration absorber as claimed in claim 1, wherein an external tube is arranged coaxially with said power cylinder, and wherein the sensor arrangement is positioned laterally adjacent said power cylinder at said external tube and at a right angle to the longitudinal axis of said power cylinder.

25. A vibration absorber as claimed in claim 1, wherein said sensor arrangement is adapted to be exchangeable.

26. A vibration absorber as claimed in claim 1, wherein said sensor arrangement is disposed proximate the bottom of said power cylinder.

27. A hydraulic controllable vibration absorber for automotive vehicles comprising:
- a power cylinder defining an interior space, a piston residing in said interior space and subdividing said interior space, into a first and a second power chamber,
- a piston rod attached to said piston,
- a balancing chamber connected to both power chambers and in communication with the first power chamber through a connecting duct and with the second power chamber through a first non-return valve,
- a controllable vibration absorber valve which permits a varying vibration absorbing force, a sensor arrangement having an output variable for recognizing the direction of movement of the piston, wherein the sensor arrangement is interposed between the second power chamber and the balancing chamber and is operable by the differential pressure prevailing between them.

* * * * *